US012612995B2

(12) United States Patent
    Xia

(10) Patent No.: US 12,612,995 B2
(45) Date of Patent: Apr. 28, 2026

(54) TELESCOPING LEG AND SUPPORT BRACKET

(71) Applicant: SHENZHEN OSM TECH INNOVATION CO., LTD., Shenzhen (CN)

(72) Inventor: Meihua Xia, Shenzhen (CN)

(73) Assignee: SHENZHEN OSM TECH INNOVATION CO., LTD., Shenzhen (CN)

( * ) Notice: Subject to any disclaimer, the term of this patent is extended or adjusted under 35 U.S.C. 154(b) by 78 days.

(21) Appl. No.: 18/850,507

(22) PCT Filed: Oct. 17, 2022

(86) PCT No.: PCT/CN2022/125658
§ 371 (c)(1),
(2) Date: Sep. 24, 2024

(87) PCT Pub. No.: WO2024/065894
PCT Pub. Date: Apr. 4, 2024

(65) Prior Publication Data
US 2025/0216024 A1 Jul. 3, 2025

(30) Foreign Application Priority Data
Sep. 29, 2022 (CN) .......................... 202222600113.8

(51) Int. Cl.
*F16M 11/28* (2006.01)
(52) U.S. Cl.
CPC ....... *F16M 11/28* (2013.01); *F16M 2200/027* (2013.01); *F16M 2200/08* (2013.01)
(58) Field of Classification Search
CPC ............. F16M 11/28; F16M 2200/027; F16M 2200/08
See application file for complete search history.

(56) References Cited

U.S. PATENT DOCUMENTS

| | | | |
|---|---|---|---|
| 6,688,566 B1 * | 2/2004 | Crain ..................... | G01C 15/00 248/168 |
| 10,788,158 B2 * | 9/2020 | Fiore ..................... | F16M 11/34 |

(Continued)

FOREIGN PATENT DOCUMENTS

| | | | | |
|---|---|---|---|---|
| CN | 207349739 U | * | 5/2018 | |
| CN | 112253956 A | * | 1/2021 | ............. F16M 11/32 |
| CN | 217503248 U | * | 9/2022 | |

OTHER PUBLICATIONS

International Search Report and Written Opinion of the International Searching Authority mailed on Dec. 29, 2022 for PCT Patent application No. PCT/CN2022/125658.

(Continued)

*Primary Examiner* — Terrell L McKinnon
*Assistant Examiner* — Ding Y Tan
(74) *Attorney, Agent, or Firm* — Maschoff Brennan

(57) ABSTRACT

A telescoping leg includes a support handle, a telescoping arm assembly and a friction assembly. The support handle has an accommodation chamber. The telescoping arm assembly includes a first telescoping arm arranged in the accommodation chamber to be slidably switchable between retracted and extended positions. The friction assembly on a sliding end of the first telescoping arm resiliently abuts a chamber wall of the accommodation chamber for providing a sliding friction force. In the retracted position, the first telescoping arm is accommodated within the accommodation chamber. In the extended position, the first telescoping arm extends outside the accommodation chamber. The support length of the telescoping leg can be adjusted to accommodate a wider range of terrains of use, thereby improving the applicability, improving smoothness and steadiness of the telescoping movement of the telescoping arm, improving (Continued)

the service life thereof, and ensuring the stability of the supported object.

10 Claims, 5 Drawing Sheets

(56)                           References Cited

U.S. PATENT DOCUMENTS

| | | | | |
|---|---|---|---|---|
| 11,774,035 | B2 * | 10/2023 | Fiore ...................... | F16M 11/32 |
| | | | | 248/157 |
| D1,044,914 | S  * | 10/2024 | Ma .............................. | D16/244 |
| 2021/0400175 | A1 * | 12/2021 | Dunn ..................... | F16M 11/16 |

OTHER PUBLICATIONS

Extended European Search Report dated Jun. 26, 2025 for European patent application No. 22960496.2.
First Office Action dated Oct. 14, 2025 for KR patent application No. 10-2024-7036836.

* cited by examiner

TELESCOPING LEG AND SUPPORT BRACKET

CROSS REFERENCE TO RELATED APPLICATIONS

The present application claims priority to the Chinese patent application No. 202222600113.8 filed on Sep. 29, 2022 to the CNIPA, and entitled "telescoping leg and support bracket", the entire content of which is incorporated herein by reference.

TECHNICAL FIELD

The present application relates to the technical field of leg brackets, in particular relates to a telescoping leg and a support bracket.

BACKGROUND

A support bracket for supporting a load device such as a camera, a mobile phone or a tablet computer usually comprises a support assembly having a first end and a second end opposite to each other along its lengthwise direction; a head assembly telescopically disposed at the first end of the support assembly and used for placing the load device thereon; and a leg assembly disposed at the second end of the support assembly to be foldable and deployable.

However, the length of the leg assembly of existing support brackets is generally fixed, and it is not possible to adjust the size of the support face, which cannot cater for the support requirements of different terrains, and cannot ensure that the demands for support stability of the support bracket in various application scenarios are met, and the applicability thereof is poor.

SUMMARY OF THE INVENTION

The main purpose of the present application is to provide a telescoping leg and a support bracket, which are intended to improve the applicability thereof.

In order to achieve the above purpose, the present application provides a telescoping leg that comprises:

a support handle provided with an accommodation chamber;

a telescoping arm assembly comprising at least a first telescoping arm, wherein the first telescoping arm is arranged in the accommodation chamber to be slidably switchable between a retracted position and an extended position; and a friction assembly provided on a sliding end of the first telescoping arm and resiliently abutting against a chamber wall of the accommodation chamber for providing a sliding friction force;

wherein, in the retracted position, the first telescoping arm is accommodated within the accommodation chamber;

wherein, in the extended position, the first telescoping arm extends outside the accommodation chamber.

Optionally, the first telescoping arm comprises a foot base, a first telescoping rod, and a second telescoping rod disposed opposite the first telescoping rod, one end of the first telescoping rod and one end of the second telescoping rod are respectively fixed on the foot base, and the other end of the first telescoping rod and the other end of the second telescoping rod are respectively slidably disposed within the accommodation chamber by means of the friction assembly.

Optionally, the friction assembly comprises a first friction block, a second friction block and a first elastic member, both sides of the sliding end of the first telescoping arm are provided with a recessed platform, the two recessed platforms are both provided with a through hole for a connecting member to pass through, the first friction block and the second friction block are respectively mounted on the two recessed platforms and are connected and fixed to each other via the connecting member, and the first elastic member is provided between the first friction block and the second friction block.

Optionally, the support handle comprises a handle body and a bottom cover provided at the bottom of the handle body, two accommodation chambers are provided within the bottom cover and both extend along the length direction of the bottom cover.

Optionally, the telescoping leg further comprises a locking assembly, the locking assembly is disposed on the support handle; the locking assembly is configured to restrict sliding movement of the first telescoping arm when the first telescoping arm is in the extended position.

Optionally, the locking assembly comprises a button and a second elastic member, the support handle is provided with a button hole, the button is mounted in the button hole and abuts against an inner wall of the support handle by means of the second elastic member, the first telescoping arm is provided with a sliding edge, the first telescoping arm or the friction assembly is provided with a latching mechanism connected to the sliding edge, an insertion end of the button is arranged on the sliding edge, and the button is provided with a latching block configured to cooperate with the latching mechanism in a snap-fit manner, and when the latching block is snapped into the latching mechanism, the first telescoping arm is restricted from sliding.

Optionally, the sliding edge on the first telescoping rod and the sliding edge on the second telescoping rod are provided with a plurality of pairs of teeth distributed along the length direction of the support handle, with each pair of teeth having positions opposite to each other, so as to form a plurality of sets of latching mechanisms, two sides of the insertion end of the button are provided with two latching blocks, and when the two latching blocks are snapped into one pair of the teeth, the first telescoping arm is restricted from sliding.

Optionally, the telescoping leg further comprises a second telescoping arm, the second telescoping arm is telescopically arranged on the first telescoping arm.

Optionally, the telescoping leg further comprises a third telescoping arm, the third telescoping arm is telescopically arranged on the second telescoping arm.

In order to achieve the above purpose, the present application further proposes a support bracket that comprises the telescoping leg as described above, wherein the telescoping leg comprises:

a support handle provided with an accommodation chamber;

a telescoping arm assembly comprising at least a first telescoping arm, wherein the first telescoping arm is arranged in the accommodation chamber to be slidably switchable between a retracted position and an extended position; and a friction assembly provided on a sliding end of the first telescoping arm and resiliently abutting against a chamber wall of the accommodation chamber for providing a sliding friction force;

wherein, in the retracted position, the first telescoping arm is accommodated within the accommodation chamber;

wherein, in the extended position, the first telescoping arm extends outside the accommodation chamber.

In the technical solution of the present application, the telescoping leg comprises a support handle, a telescoping arm assembly and a friction assembly; the support handle is provided with an accommodation chamber; the telescoping arm assembly comprises at least a first telescoping arm, wherein the first telescoping arm is arranged in the accommodation chamber to be slidably switchable between a retracted position and an extended position; the friction assembly is provided on a sliding end of the first telescoping arm and resiliently abuts against a chamber wall of the accommodation chamber for providing a sliding friction force; wherein, in the retracted position, the first telescoping arm is accommodated within the accommodation chamber; wherein, in the extended position, the first telescoping arm extends outside the accommodation chamber. In this way, the support length of the telescoping leg can be adjusted to cater for a wider range of terrains of use, thereby improving the applicability.

In addition, since the sliding end of the first telescoping arm is provided with a friction assembly, and the friction assembly resiliently abuts against the chamber wall of the accommodation chamber, during the sliding process, the friction assembly can always press against the chamber wall of the accommodation chamber of the support handle under the action of the resilient force, which provides the sliding friction force, so that the first telescoping arm can slide smoothly and steadily, avoiding direct contact between the first telescoping arm and the accommodation chamber, thereby reducing wear and tear of the sliding end of the first telescoping arm, and improving the service life of the first telescoping arm.

BRIEF DESCRIPTION OF THE DRAWINGS

In order to more clearly explain the technical solutions in the embodiments of the present application or in the prior art, accompanying drawings that need to be used in the description of the embodiments or the prior art are briefly introduced below. Apparently, the accompanying drawings described below only represent some embodiments of the present application. For a person with ordinary skill in the art, other accompanying drawings are obtainable according to the structures shown in these accompanying drawings without expenditure of any creative labor.

REFERENCE SIGNS

Figure 1:
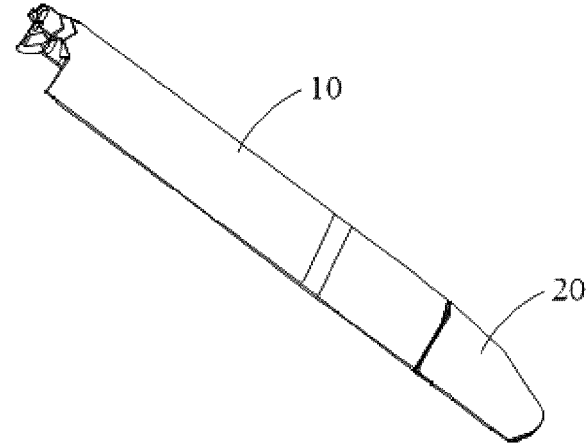
FIG. 1 is a structural schematic diagram of the telescoping leg in the retracted position of the first embodiment of the present application.
Figure 2:
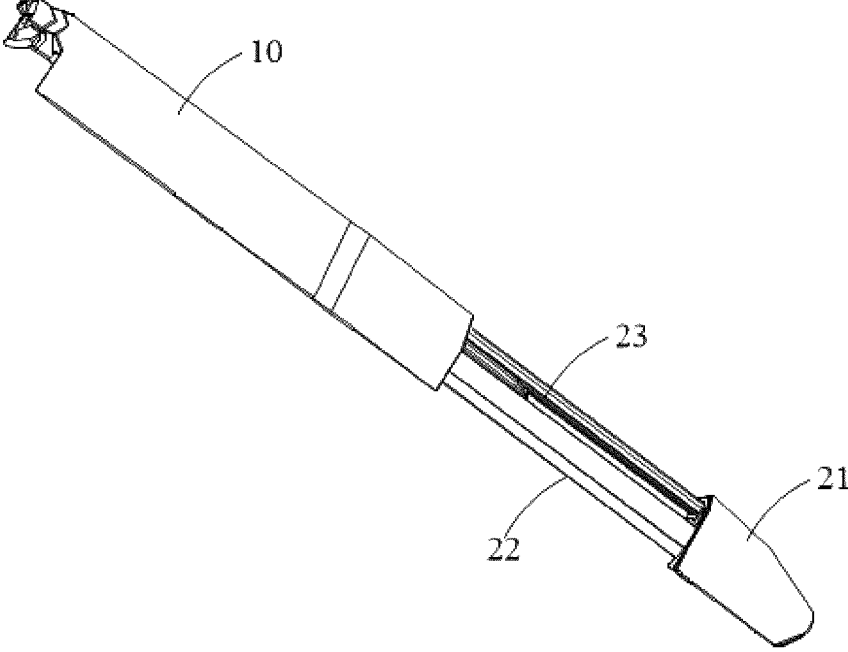
FIG. 2 is a structural schematic diagram of the telescoping leg in the extended position of the first embodiment of the present application.

10, support handle; 20, telescoping arm assembly; 30, friction assembly; 40, locking assembly; 10*a*, accommodation chamber; 21, foot base; 22, first telescoping rod; 23, second telescoping rod; 31, first friction block; 32, second friction block; 33, first elastic member; 201, recessed platform; 11, handle body; 12, bottom cover; 41, button; 42, second elastic member; 211, sliding edge; 212, latching mechanism; 411, latching block; 2111, tooth.

DETAILED DESCRIPTION

Hereinafter, the technical solution in the embodiments of the present application will be clearly and completely described in combination with accompanying drawings in the embodiments of the present application. Apparently, embodiments described only represent part of the embodiments of the present application, not all the embodiments. All other embodiments obtainable by those with ordinary skill in the art based on the embodiments described in the present application without expenditure of creative labor all fall within the scope of protection of the present application.

It should be noted that if the embodiments of the present application involve directional indications (such as up, down, left, right, forward, back . . . ), such directional indications are only used to explain the relative positional relationship, movement condition and the like among the various components in a specific attitude (as shown in the accompanying drawings), and if the specific attitude is changed, the directional indications would also change accordingly.

Furthermore, if the embodiments of the present application involve the descriptions of "first", "second", etc., the descriptions of "first", "second", etc. are used only for descriptive purposes, and are not to be understood as indicating or implying their relative importance or implicitly specifying the number of the indicated technical features. As a result, a feature defined as "first" or "second" may explicitly or implicitly include at least one of the features. In addition, the meaning of "and/or" appearing in the entire description is that three parallel embodiments are included, for example, "A and/or B" includes an A embodiment, or a B embodiment, or an embodiment in which both A and B are satisfied. In addition, the technical solutions of the various embodiments may be combined with each other, but it must be based on the premise that a person with ordinary skill in the art is able to implement such combination, and when a combination of technical solutions appears to be contradictory or unachievable, it should be regarded that such combination of technical solutions does not exist and is not included in the scope of protection claimed by the present application.

The present application provides a telescoping leg suitable for a support bracket, especially for a support bracket for supporting a load device such as a camera, a mobile phone or a tablet computer, which is not limited herein.

Referring to FIGS. 1 to 5, in an embodiment of the present application, the telescoping leg comprises a support handle 10, a telescoping arm assembly 20, and a friction assembly 30; the support handle 10 is provided with an accommodation chamber 10a; the telescoping arm assembly 20 comprises at least a first telescoping arm, wherein the first telescoping arm is arranged in the accommodation chamber 10a to be slidably switchable between a retracted position and an extended position; the friction assembly 30 is provided on a sliding end of the first telescoping arm and resiliently abuts against a chamber wall of the accommodation chamber 10a for providing a sliding friction force; wherein, in the retracted position, the first telescoping arm is at least partially accommodated within the accommodation chamber 10a; wherein, in the extended position, the first telescoping arm extends outside the accommodation chamber 10a.

In this embodiment, the support handle 10 may be in the shape of a rod, the cross-section of which may be round, square or polygonal, etc. The support handle 10 may be manufactured by one-piece integral moulding, or it may be an assembled structure with individual components, which is not specifically limited herein.

It should be noted that the telescoping arm assembly 20 may comprise a first telescoping arm, the first telescoping arm being telescopically arranged on the support handle 10, and may further comprise a second telescoping arm, the second telescoping arm being telescopically arranged on the first telescoping arm, and of course, a third telescoping arm or more support arms may also be included, with a latter stage of telescoping arm being telescopically arranged on a former stage of telescoping arm. That is, the telescoping leg of the present application may be a two-stage telescoping structure, a three-stage telescoping structure, or a multi-stage telescoping structure, which can cater for more terrains of use and satisfy the use demands of more application scenarios.

Wherein, the first telescoping arm may be a single component or may be assembled with two or more components, which is not specifically limited herein.

The friction assembly 30 may comprise at least one friction block, and the friction block may be made of plastic or metal part with high wear resistance, and the surface of the friction block may be smoothed, or lubricating oil may be applied thereon, or the like, so as to improve the smoothness of sliding of the first telescoping arm.

In the technical solution of the present application, the telescoping leg comprises a support handle 10, a telescoping arm assembly 20 and a friction assembly 30; the support handle 10 is provided with an accommodation chamber 10a; the telescoping arm assembly 20 comprises at least a first telescoping arm, wherein the first telescoping arm is arranged in the accommodation chamber 10a to be slidably switchable between a retracted position and an extended position; the friction assembly 30 is provided on a sliding end of the first telescoping arm and resiliently abuts against a chamber wall of the accommodation chamber 10a for providing a sliding friction force; wherein, in the retracted position, the first telescoping arm is accommodated within the accommodation chamber 10a; wherein, in the extended position, the first telescoping arm extends outside the accommodation chamber 10a. In this way, the support length of the telescoping leg can be adjusted, so that the size of the support face can be adjusted (the support face of the support bracket is formed by lines linking the ends of three or more telescoping legs at the bottom thereof), to cater for a wider range of terrains of use, thereby improving the applicability.

Figure 5:
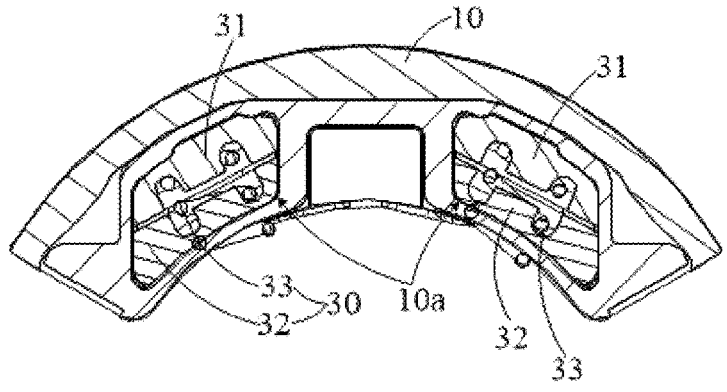
FIG. 5 is a sectional view of the telescoping leg of the first embodiment of the present application.
Figure 6:
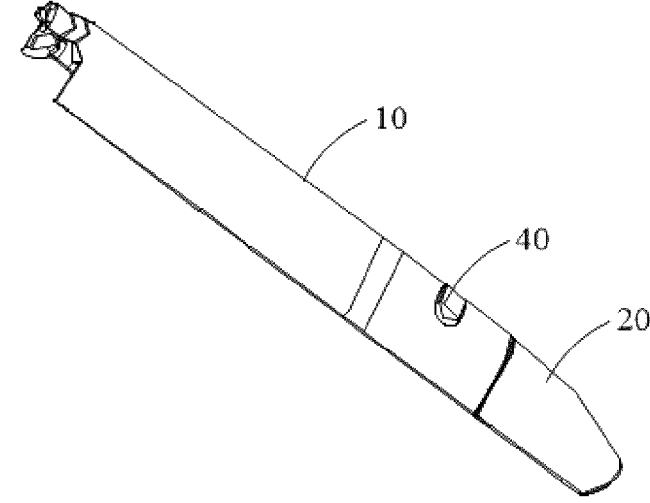
FIG. 6 is a structural schematic diagram of the telescoping leg in the retracted position of the second embodiment of the present application.
Figure 7:
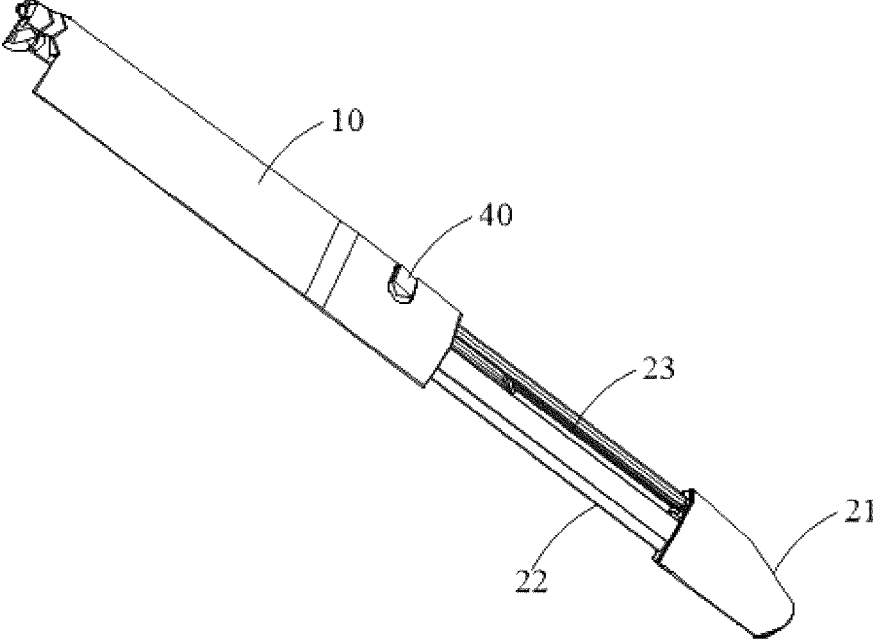
FIG. 7 is a structural schematic diagram of the telescoping leg in the extended position of the second embodiment of the present application.
Figure 8:
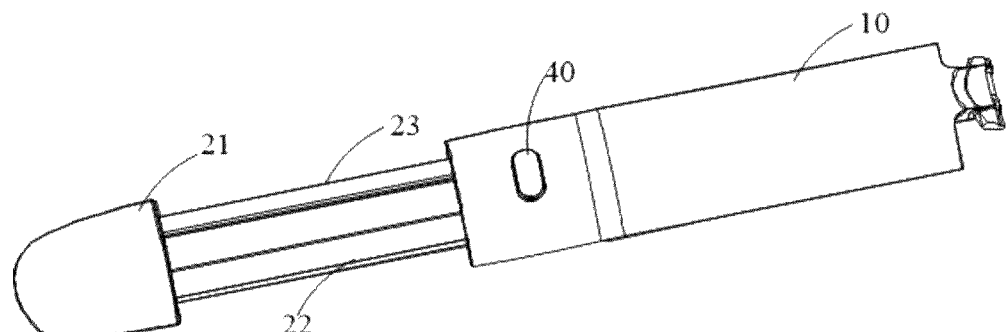
FIG. 8 is a structural schematic diagram of the telescoping leg of the second embodiment of the present application.

In addition, referring mainly to FIG. 5, since the sliding end of the first telescoping arm is provided with a friction assembly 30, and the friction assembly 30 resiliently abuts against the chamber wall of the accommodation chamber 10a, during the sliding process, the friction assembly 30 can always press against the chamber wall of the accommodation chamber 10a of the support handle 10 under the action of the resilient force, which provides the sliding friction force, so that the first telescoping arm can slide smoothly and steadily, avoiding direct contact between the first telescoping arm and the accommodation chamber 10a, thereby reducing wear and tear of the sliding end of the first telescoping arm, and improving the service life of the first telescoping arm.

Figure 3:
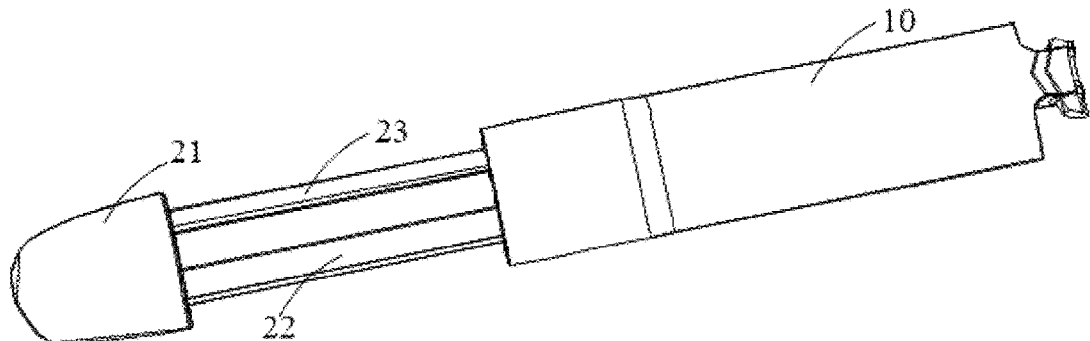
FIG. 3 is a structural schematic diagram of the telescoping leg of the first embodiment of the present application.
Figure 4:
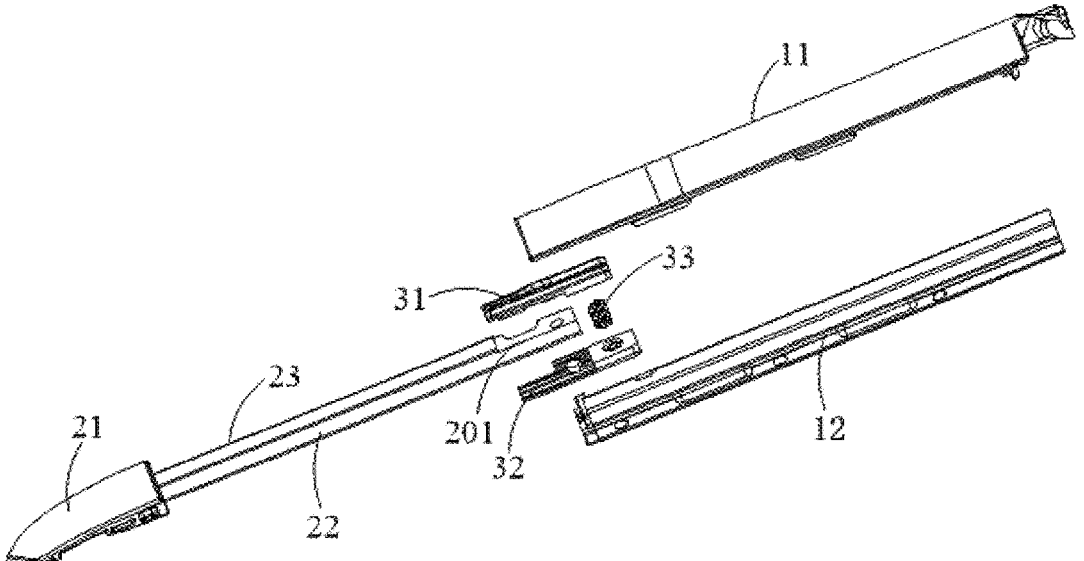
FIG. 4 is an exploded view of the telescoping leg of the first embodiment of the present application.

In order to improve the convenience of assembly, save materials and reduce the manufacturing costs, referring to FIGS. 3 to 5, in an embodiment, the first telescoping arm may comprise a foot base 21, a first telescoping rod 22, and a second telescoping rod 23 disposed opposite the first telescoping rod 22, one end of the first telescoping rod 22 and one end of the second telescoping rod 23 are respectively fixed on the foot base 21, and the other end of the first telescoping rod 22 and the other end of the second telescoping rod 23 are respectively slidably disposed within the accommodation chamber 10a by means of the friction assembly 30.

Wherein, the central part of the first telescoping arm is a hollow structure, which can save materials and reduce the manufacturing costs.

In this embodiment, the number of accommodation chambers 10a may be two, and both accommodation chambers 10a extend along the length direction of a bottom cover 12, and the width of each accommodation chamber 10a may be adapted to the width of its corresponding telescoping rod, so as to avoid deviation of each telescoping rod in the process of sliding and telescoping, thereby improving the smoothness and steadiness of sliding.

In order to further improve the steadiness and smoothness of the sliding of the first telescoping arm, and to prevent the sliding end thereof from being worn out, referring to FIGS. 4 and 5, in one embodiment, the friction assembly 30 may comprise a first friction block 31, a second friction block 32 and a first elastic member 33, both sides of the sliding end of the first telescoping arm are provided with a recessed platform 201, the two recessed platforms 201 are both provided with a through hole for a connecting member to pass through, the first friction block 31 and the second friction block 32 are respectively mounted on the two recessed platforms 201 and are connected and fixed to each other via the connecting member, and the first elastic member 33 is provided between the first friction block 31 and the second friction block 32. Wherein, the connecting member may be a screw nail or a screw bolt, etc., which is not limited herein.

In this embodiment, the first elastic member 33 may be a spring or other components with certain elasticity, which is not limited herein.

Referring mainly to FIG. 4, in this embodiment, the support handle 10 may comprise a handle body 11 and a bottom cover 12 provided at the bottom of the handle body 11, and the accommodation chamber 10*a* is provided within the bottom cover 12.

On the one hand, providing the handle body 11 can improve the overall reliability of the telescoping leg and facilitate assembling it; on the other hand, the handle body 11 has a certain decorative effect and can improve the aesthetics of the telescoping leg.

Referring to FIGS. 6 to 11, in another embodiment, the telescoping leg may further comprise a locking assembly 40, the locking assembly 40 is disposed on the support handle 10; the locking assembly 40 is configured to restrict sliding movement of the first telescoping arm when the first telescoping arm is in the extended position. In this way, the stability of the telescoping leg when supporting an object can be improved by preventing automatic sliding of the telescoping arm thereof.

Figure 9:
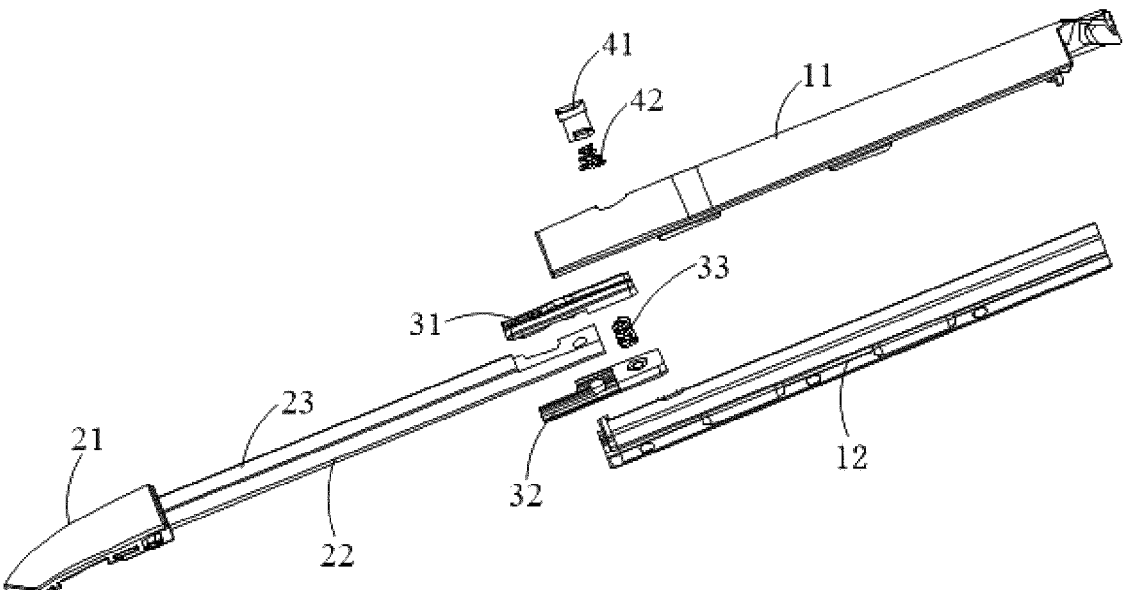
FIG. 9 is an exploded view of the telescoping leg of the second embodiment of the present application.
Figure 10:
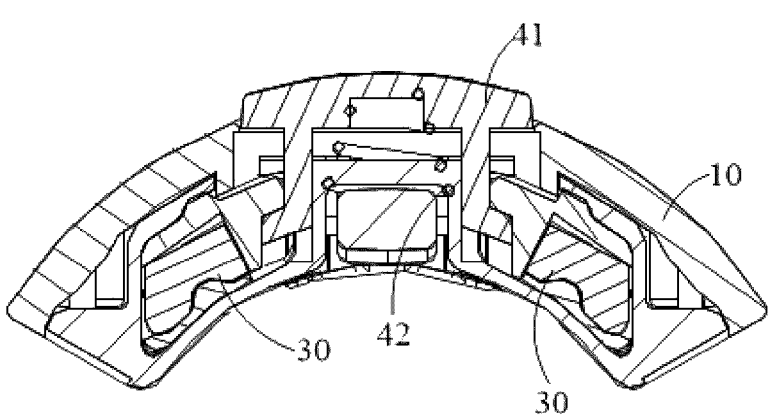
FIG. 10 is a sectional view of the telescoping leg of the second embodiment of the present application.
Figure 11:
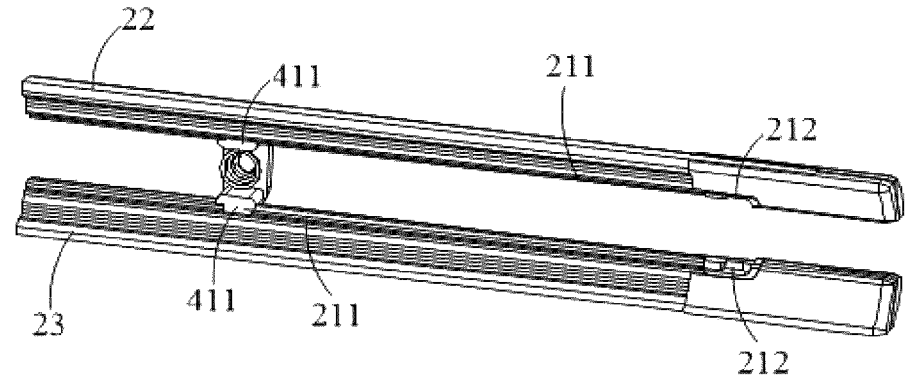
FIG. 11 is a structural diagram of the connection between the telescoping arm assembly and the locking assembly of the telescoping leg in the second embodiment of the present application.

Referring to FIGS. 9 to 11, in this embodiment, the locking assembly 40 may comprise a button 41 and a second elastic member 42, the support handle 10 is provided with a button hole, the button 41 is mounted in the button hole and abuts against an inner wall of the support handle 10 by means of the second elastic member 42, the first telescoping rod 22 and the second telescoping rod 23 of the first telescoping arm are both provided with sliding edges 211, the first telescoping arm or the friction assembly 30 is provided with a latching mechanism 212 connected to the sliding edges 211, an insertion end of the button 41 is configured to engage with the sliding edges 211, and the button 41 is provided with a latching block 411 configured to cooperate with the latching mechanism 212 in a snap-fit manner, and when the latching block 411 is snapped into the latching mechanism 212, the first telescoping arm is restricted from sliding.

It should be noted that, in this embodiment, when the first telescoping arm is pulled to the fully extended position, the latching block 411 of the button 41 is snapped into the latching mechanism 212, and the first telescoping rod 22 and the second telescoping rod 23 of the first telescoping arm are locked and can not continue to slide, so as to keep it in a stable extended state. When the button 41 is pressed, the latching block 411 of the button 41 is disengaged from the latching mechanism 212, the locking is thus released, and the first telescoping rod 22 and the second telescoping rod 23 of the first telescoping arm are released from the locked state, so that the first telescoping arm can be adjusted to the retracted position.

It is worth mentioning that the number of latching mechanisms 212 may be one or more, and in order to make the telescoping leg have a plurality of stable extended positions, a plurality of latching mechanisms 212 or a plurality of pairs of latching mechanisms 212 that are disposed opposite to each other may be provided on the sliding edges 211 on the first telescoping rod 22 and the second telescoping rod 23 of the first telescoping arm and distributed in the length direction thereof, so that the locking position of the first telescoping arm may be slidably adjusted by pressing the button 41 to adjust the extended length, so as to satisfy the demands of different application scenarios.

Figure 12:
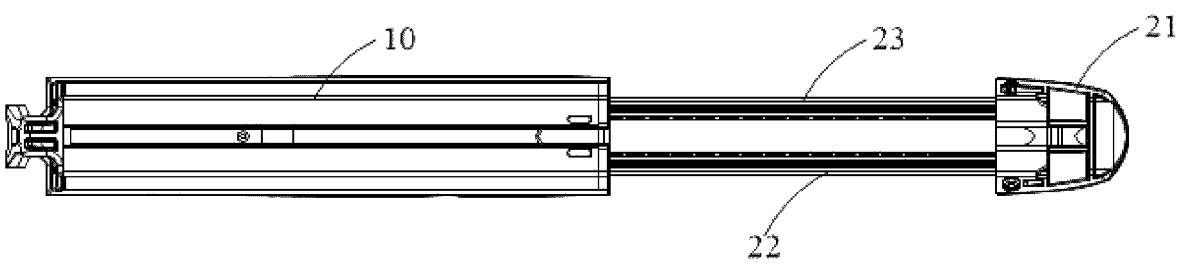
FIG. 12 is a structural schematic diagram of the telescoping leg of the third embodiment of the present application.
Figure 13:
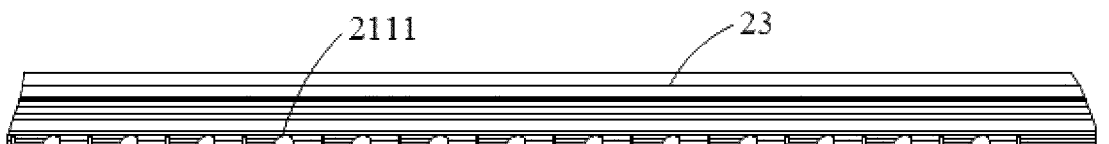
FIG. 13 is a structural schematic diagram of the first telescoping arm of the telescoping leg in the third embodiment of the present application.
Figure 13:
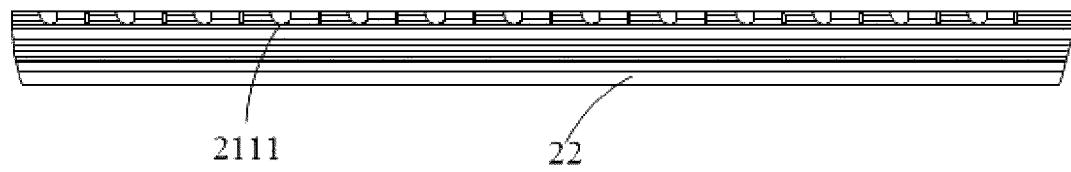

More specifically, as shown in FIGS. 12 and 13, the sliding edges 211 on the first telescoping rod 22 and the second telescoping rod 23 may be provided with a plurality of pairs of teeth 2111 distributed along the length direction of the support handle 10, with each pair of teeth having positions opposite to each other, so as to form a plurality of sets of latching mechanisms 212, two sides of the insertion end of the button 41 are provided with two latching blocks

411, and when the two latching blocks 411 are snapped into one pair of the teeth 2111, the first telescoping arm is restricted from sliding.

The present application also provides a support bracket, that comprises at least three telescoping legs, the specific structure of each telescoping leg thereof can refer to the description in the above embodiments, and since the support bracket provided by the present application comprises all technical solutions of all the above embodiments of the telescoping leg, and therefore has at least the same technical effects as those of the telescoping leg, these embodiments of the support bracket will not be elaborated one by one herein.

The above-mentioned are only optional embodiments of the present application, and are not intended to limit the scope of the present patent application, and any equivalent structural variation made under the inventive concept of the present application by utilizing the contents of the specification and the accompanying drawings of the present application, or directly/indirectly applying them in other related technical fields, are all included in the scope of protection of the present patent application.

The invention claimed is:

1. A telescoping leg, comprising:
   a support handle provided with an accommodation chamber;
   a telescoping arm assembly comprising at least a first telescoping arm, wherein the first telescoping arm is arranged in the accommodation chamber to be slidably switchable between a retracted position and an extended position; and
   a friction assembly provided on a sliding end of the first telescoping arm and resiliently abutting against a chamber wall of the accommodation chamber for providing a sliding friction force;
   wherein:
      in the retracted position, the first telescoping arm is accommodated within the accommodation chamber; and
      in the extended position, the first telescoping arm extends outside the accommodation chamber.

2. The telescoping leg according to claim 1, wherein:
   the first telescoping arm comprises a foot base, a first telescoping rod, and a second telescoping rod disposed opposite the first telescoping rod,
   one end of the first telescoping rod and one end of the second telescoping rod are respectively fixed on the foot base, and
   the other end of the first telescoping rod and the other end of the second telescoping rod are respectively slidably disposed within the accommodation chamber by means of the friction assembly.

3. The telescoping leg according to claim 2, wherein:
   the friction assembly comprises a first friction block, a second friction block and a first elastic member,
   both sides of the sliding end of the first telescoping arm are provided with a recessed platform,
   the two recessed platforms are both provided with a through hole for a connecting member to pass through,
   the first friction block and the second friction block are respectively mounted on the two recessed platforms and are connected and fixed to each other via the connecting member, and
   the first elastic member is provided between the first friction block and the second friction block.

4. The telescoping leg according to claim 3, wherein:
   the support handle comprises a handle body and a bottom cover provided at the bottom of the handle body, and two accommodation chambers are provided within the bottom cover and both extend along the length direction of the bottom cover.

5. The telescoping leg according to claim 2, wherein:

the telescoping leg further comprises a locking assembly, the locking assembly is disposed on the support handle, and the locking assembly is configured to restrict sliding movement of the first telescoping arm when the first telescoping arm is in the extended position.

6. The telescoping leg according to claim 5, wherein:

the locking assembly comprises a button and a second elastic member, the support handle is provided with a button hole, the button is mounted in the button hole and abuts against an inner wall of the support handle by means of the second elastic member, the first telescoping arm is provided with a sliding edge, the first telescoping arm or the friction assembly is provided with a latching mechanism connected to the sliding edge, an insertion end of the button is configured to engage with the sliding edge, the button is provided with a latching block configured to cooperate with the latching mechanism in a snap-fit manner, and when the latching block is snapped into the latching mechanism, the first telescoping arm is restricted from sliding.

7. The telescoping leg according to claim 6, wherein:

the sliding edge on the first telescoping rod and the sliding edge on the second telescoping rod are provided with a plurality of pairs of teeth distributed along the length direction of the support handle, with each pair of teeth having positions opposite to each other, so as to form a plurality of sets of latching mechanisms, two sides of the insertion end of the button are provided with two latching blocks, and when the two latching blocks are snapped into one pair of the teeth, the first telescoping arm is restricted from sliding.

8. The telescoping leg according to claim 1, wherein:

the telescoping leg further comprises a second telescoping arm, and the second telescoping arm is telescopically arranged on the first telescoping arm.

9. The telescoping leg according to claim 8, wherein:

the telescoping leg further comprises a third telescoping arm, and the third telescoping arm is telescopically arranged on the second telescoping arm.

10. A support bracket, comprising the telescoping leg according to claim 1.

* * * * *